Sept. 26, 1933.  G. R. HOBBS  1,928,377
CALCULATOR
Filed Dec. 19, 1932  2 Sheets-Sheet 1

Inventor
George R. Hobbs

By Clarence A. O'Brien
Attorney

Sept. 26, 1933.                G. R. HOBBS                1,928,377
                                CALCULATOR
                         Filed Dec. 19, 1932      2 Sheets-Sheet 2

Inventor
George R. Hobbs
By Clarence A. O'Brien
Attorney

Patented Sept. 26, 1933

1,928,377

UNITED STATES PATENT OFFICE 1,928,377

CALCULATOR

George Richard Hobbs, Fort Madison, Iowa

Application December 19, 1932
Serial No. 648,008

1 Claim. (Cl. 235—66)

This invention relates to a fraction calculator, the general object of the invention being to provide a cylinder, preferably forming a casing for a steel tape measure, having its circumference provided with graduations, a disk rotatably arranged on the cylinder and having a marker for cooperating with the graduations, and a handle rotatably connected with the cylinder or casing and having a marker thereon for cooperating with the graduations, said handle forming the means for turning the tape reel.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
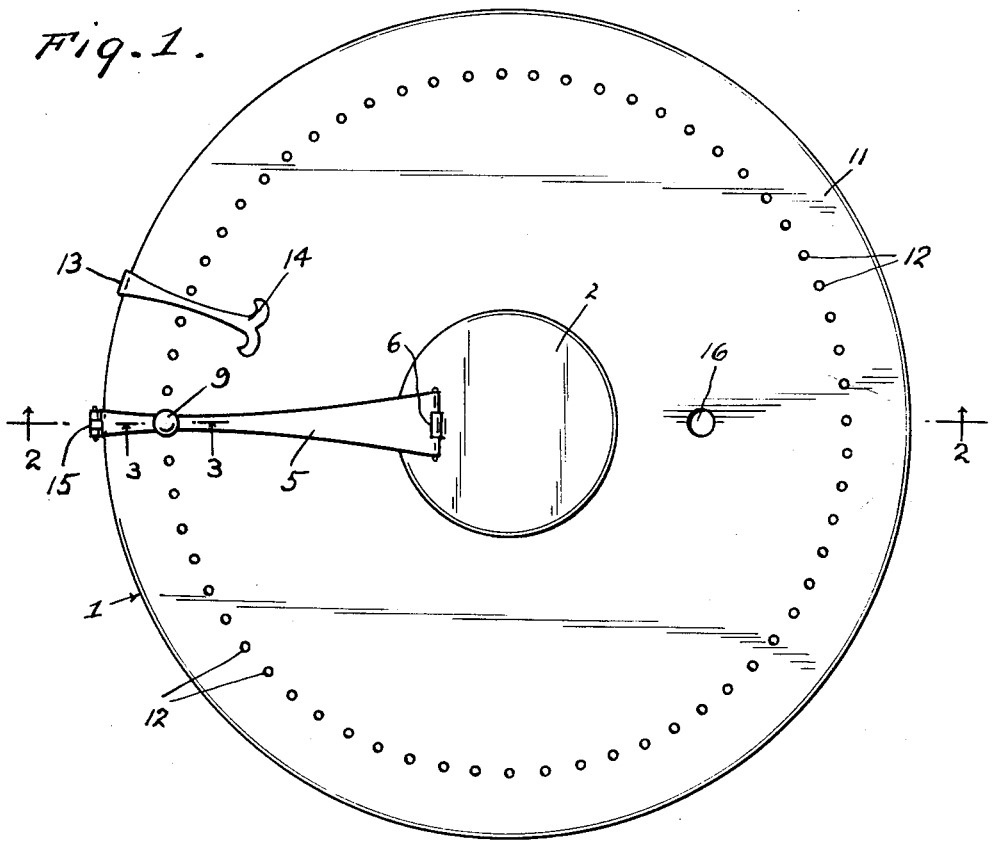
Figure 1 is a top plan view of the device.

In these drawings, the numeral 1 indicates the casing, the numeral 2 indicates the reel for the steel tape 3, a part of the circumference of the casing having a slot 4 therein for the passage of the tape.

A handle forming bar 5 is hinged to one end of the reel 2 as shown at 6 and a small housing 7 is carried by an intermediate part of the handle bar. The shank 8 of a knob 9 passes through the housing and a spring 10 is located in the housing and bears against a collar on the shank within the housing and tends to hold the shank in a position projecting from the lower face of the handle bar the knob engaging the top of the housing.

A disk 11 is rotatably supported at the top of the reel 2 and is located above the top of the casing and said disk is formed with an annular row of perforations 12 any one of which is adapted to receive the projecting end of the shank 8 when the same is in lowered position. Thus the shank 8 can be placed in any one of the recesses 12 and then by swinging the handle bar the disk will be caused to rotate with the reel 2.

Figure 2:
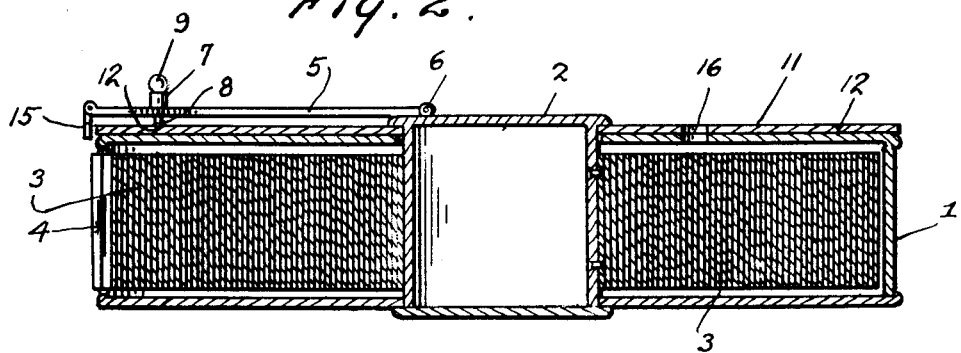
Fig. 2 is a section on line 2—2 of Fig. 1.
Figure 3:
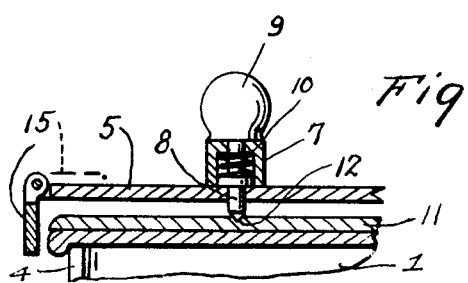
Fig. 3 is a section on line 3—3 of Fig. 1.
Figure 4:
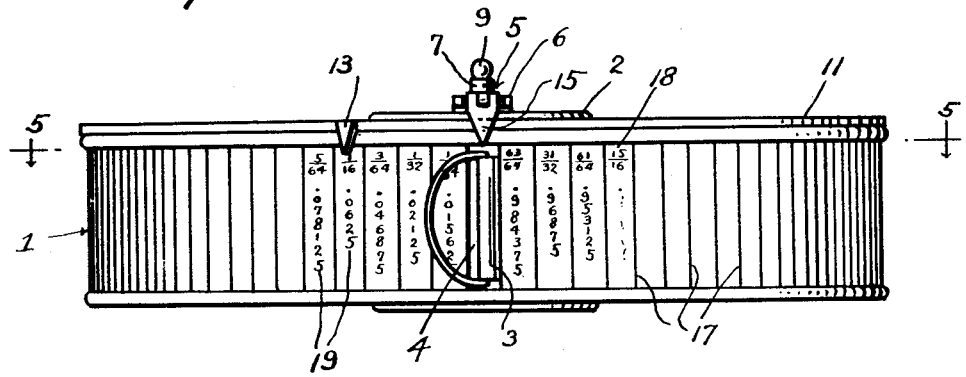
Fig. 4 is an edge view.
Figure 5:
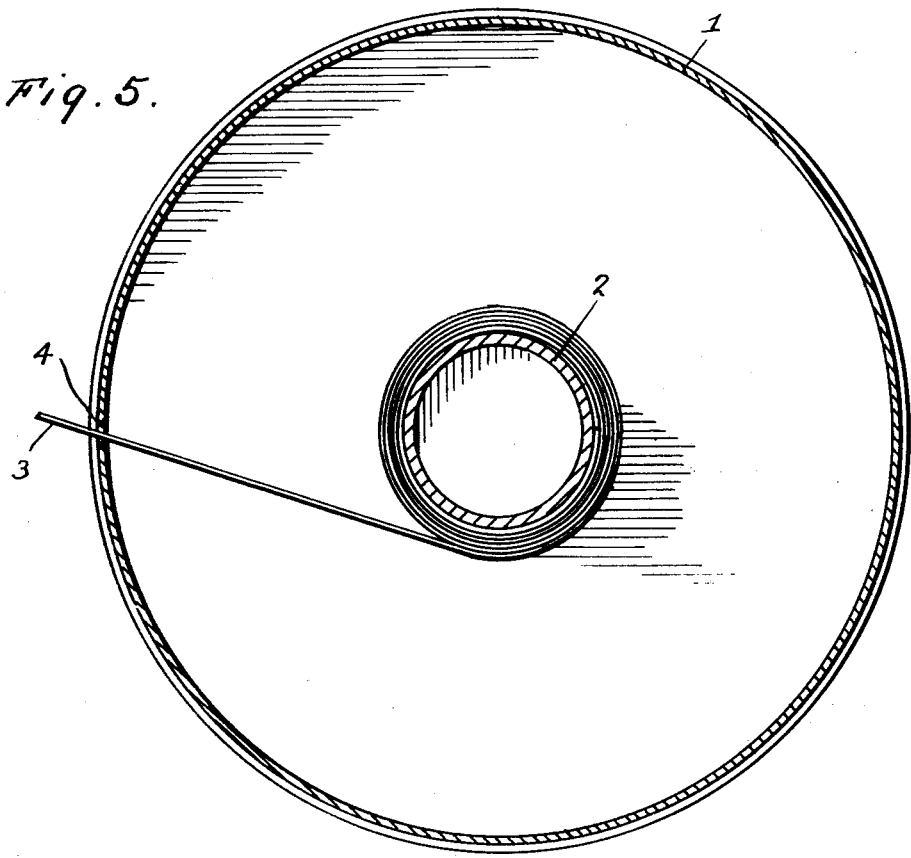
Fig. 5 is a section on line 5—5 of Fig. 4 with the tape partly pulled out.

A marker 13 is connected to a portion of the periphery of the disk 11 and projects downwardly over a portion of the circumference of the casing and the upper part of the disk has the design 14 thereon which has its outer end terminating in the projection 13. A pointed marker or projection 15 is pivotally connected to the outer end of the handle bar 5 so that it can be swung up to rest on the bar and when in lowered position will depend over the upper part of the casing as shown in Figs. 2 and 4.

Holes 16 are formed one in the disk and one in the top of the casing and when these holes are in alinement, the knob 9 and housing 7 will fit therein when the handle bar is swung over to inoperative position. Thus the parts will hold the drum or reel 2 against rotary movement.

The circumference of the casing is divided into a plurality of vertical spaces by the lines 17 and each space at its upper end contains a fraction as shown at 18 and below the fraction is the equivalent decimal numerals 19. The space which contains the slot 4 however, contains no numeral.

The casing contains sixty-four equal divisions and the fractions run from 1/64 to 63/64 and the device can be used for adding or subtracting. In starting to use the device the handle bar is given a turn or two to the left to loosen the tape so that the handle may be turned either way without interference with the operation. The marker 13 is placed at the first fraction to be added, the marker being positioned by turning the disk.

For example if 3/4 is to be added to 49/64 the marker 13 is placed at the division or space containing the fraction 3/4 and the marker or arrow 15 is placed at the space containing the tape opening. Then the handle is turned to the space containing the fraction 49/64 and this operation will move the marker 13 to the space containing the fraction 33/64. However, as the space containing the tape opening has been passed in this operation, the answer will read one inch plus 33/64, as the tape opening occupies a space equal to an inch. The operation may be repeated as often as necessary simply by adding one inch to the answer each time the tape opening is passed. For subtraction, first set the marker or arrow 13 at the fraction from which another fraction is to be subtracted.

For example, 3/4 is to be subtracted from 7/8. The marker 13 is placed at 7/8 and the marker 15 is placed at the fraction 3/4. Then turn back the handle with the marker 15 to the tape opening which will move the marker 13 to one 1/8 which is the answer. In addition, the start is made at the tape opening and the handle is moved to the fraction which is to be added to another fraction but in subtraction the handle and marker 15 is placed at the fraction which is to be subtracted from another fraction and then the parts moved to the tape opening.

It will of course be understood that the figures or fractions are so arranged on the circumference of the casing as to secure the results above set forth.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A calculator of the class described comprising a cylinder having its circumference divided into a number of equal spaces vertically arranged, figures in said spaces, a disk rotatably arranged on the cylinder and having a marker depending from an edge part thereof, a bar rotatably and hingedly connected with a part of the casing and having a marker hinged to its outer end, said marker cooperating with the graduations of the casing, and being foldable upon the bar when not in use and depending from the end of the bar when in use, said disk having an annular row of recesses therein, a spring pressed pin carried by the bar and passing therethrough and adapted to engage any one of the recesses for holding the bar and disk against relative movement, said pin having a knob on its upper end and said disk and the top of the casing having holes therein for receiving the knob when the holes are in registering position and the bar is swung upon its hinge to place the knob in said holes.

GEORGE RICHARD HOBBS.